United States Patent [19]

Eade

[11] Patent Number: 4,646,412

[45] Date of Patent: Mar. 3, 1987

[54] UNIVERSAL JOINT SERVICING TOOL

[76] Inventor: William D. Eade, P.O. Box 208, Trinity Center, Calif. 96091

[21] Appl. No.: 798,878

[22] Filed: Nov. 18, 1985

[51] Int. Cl.[4] .................... B23P 19/04

[52] U.S. Cl. .................... 29/259; 29/264

[58] Field of Search .................... 29/256, 259, 264, 266

[56] References Cited

U.S. PATENT DOCUMENTS

| | | | |
|---|---|---|---|
| 2,230,918 | 2/1941 | Walter . | |
| 2,736,954 | 3/1956 | Palmer . | |
| 2,951,282 | 9/1960 | Albright . | |
| 3,076,259 | 2/1963 | Stebbins . | |
| 3,846,891 | 11/1974 | Elg . | |
| 3,846,892 | 11/1974 | Young . | |
| 4,019,233 | 4/1977 | Jirele . | |
| 4,034,458 | 7/1977 | Ford et al. | 29/259 |
| 4,343,075 | 8/1982 | Guptill . | |
| 4,463,489 | 8/1984 | James . | |
| 4,510,661 | 4/1985 | Campa | 29/259 |

*Primary Examiner*—Robert C. Watson

*Attorney, Agent, or Firm*—Leonard D. Schappert

[57] ABSTRACT

A universal joint servicing tool for removing bearing cups from the arms of the yokes of universal joints and including means for applying force between the arms of one yoke and one arm of the other yoke, exerting force on the cross of the universal joint so that a bearing cup remote from the universal joint servicing tool is removed. Such an arrangement allows for the application of external heat to the bearing cup being removed without likelihood of damage to the universal joint servicing tool.

6 Claims, 4 Drawing Figures

UNIVERSAL JOINT SERVICING TOOL

BACKGROUND OF THE INVENTION

1. Field of the Invention

This invention relates generally to tools used with automobiles and, more specifically, to portable tools designed to assist in the disassembly of the universal joints of motor vehicles. 2. Description of the Prior Art In the past, inventors have designed numerous devices for use in assembling and disassembling universal joints used in automobiles. Many of these devices have utilized cables and other means of attachment to the arms of the cross of the universal joint, pulling on the cross and helping to remove the bearing cups of the universal joint. In each instance, the previous inventors have utilized a pulling mechanism designed to pull out the bearing cup closest to the tool. Through the use of either cables or other means of attachment, this pulling action was universally utilized. None of the prior art of which applicant is aware teaches a universal joint servicing tool designed as the present invention is to push the cross of the universal joint down and away from the bearing cup closest to the universal joint tool, thereby ejecting the bearing cup farthest from the universal joint servicing tool.

SUMMARY OF THE INVENTION

The present invention consists of a universal joint servicing tool having a base plate with two legs attached thereto designed to be positioned with the bottom ends of its legs against the arms of the yoke of a drive shaft, and including a pusher plate designed so that, when properly connected to a universal joint to be disassembled, it creates a downward pressure on the legs and against the arms of the drive shaft yoke, pushing against the cross of the universal joint and removing the bearing cup farthest from the universal joint servicing tool.

One of the objects of the present invention is to provide a portable universal joint servicing tool for disassembling universal joints in the field.

Another object of the prsent invention is to provide a universal joint servicing tool which is inexpensive to build, yet sturdy and reliable.

A further object of the present invention is to provide a universal joint servicing tool which accomplishes removal of a bearing cup of a universal joint by positive pressure; that is, pushing between the universal joint servicing tool and the cross of the universal joint, rather than pulling on the cross of the universal joint, thereby decreasing the likelihood of breakage of the universal joint servicing tool.

A further object of the present invention is to provide a universal joint servicing tool which enables its operator to apply heat directly to a bearing cup to facilitate its removal without fear of damaging the universal joint servicing tool. This results from the fact that the universal joint servicing tool is on the side of the universal joint opposite the bearing cup being removed.

The foregoing objects, as well as other objects and benefits of the present invention, are made more apparent by the descriptions and claims which follow.

DESCRIPTION OF THE PREFERRED EMBODIMENT

Figure 1:
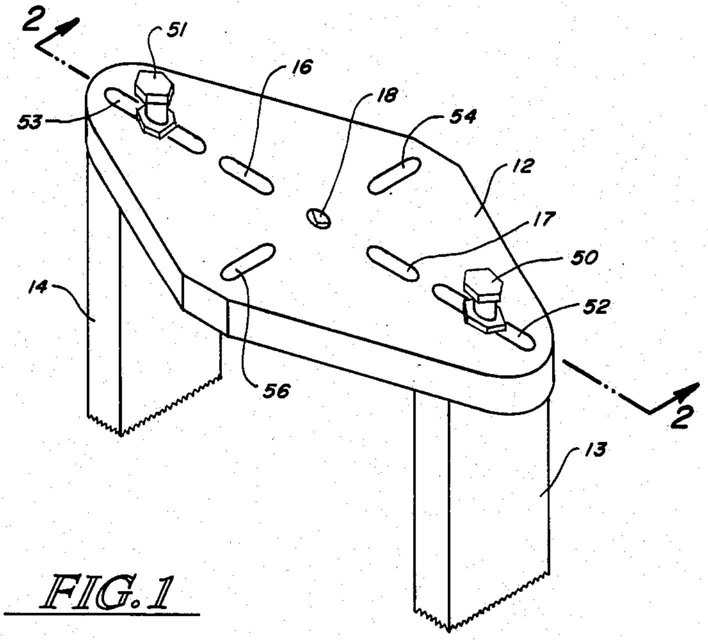
FIG. 1 is a perspective view of part of the universal joint servicing tool showing the construction of the base plate and legs thereof.

FIG. 1 of the drawings shows a part of universal joint servicing tool 10. Base plate 12, which is utilized as a part of universal joint servicing tool 10, consists of a plate of metal or other appropriate structural material having legs 13 and 14, each constructed of metal or other appropriate structural material, attached thereto by bolts 50 and 51. Bolt 50 extends through slot 52 into a threaded hole in leg 13, and bolt 51 extends through slot 53 into a threaded hole in leg 14. Legs 13 and 14 are thus rigidly attached to base plate 12. The elongation of slots 52 and 53 allows for the adjustment of legs 13 and 14 closer together or farther apart. Elongated slots 16, 17, 54 and 56 are further provided for use with pusher plate 25. A shallow hole 18 is provided to accept the end of pusner bolt 20 shown in FIGS. 2 and 3.

Figure 2:
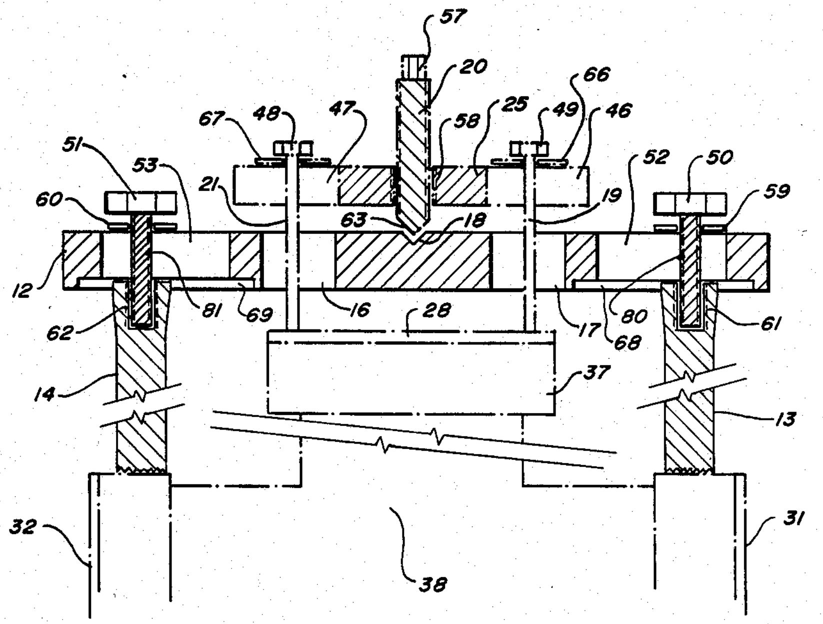
FIG. 2 is a cross-sectional view of the universal joint servicing tool taken along lines 2—2 of FIG. 1, and further showing the structure of pusher plate 25 and associated parts.
Figure 3:
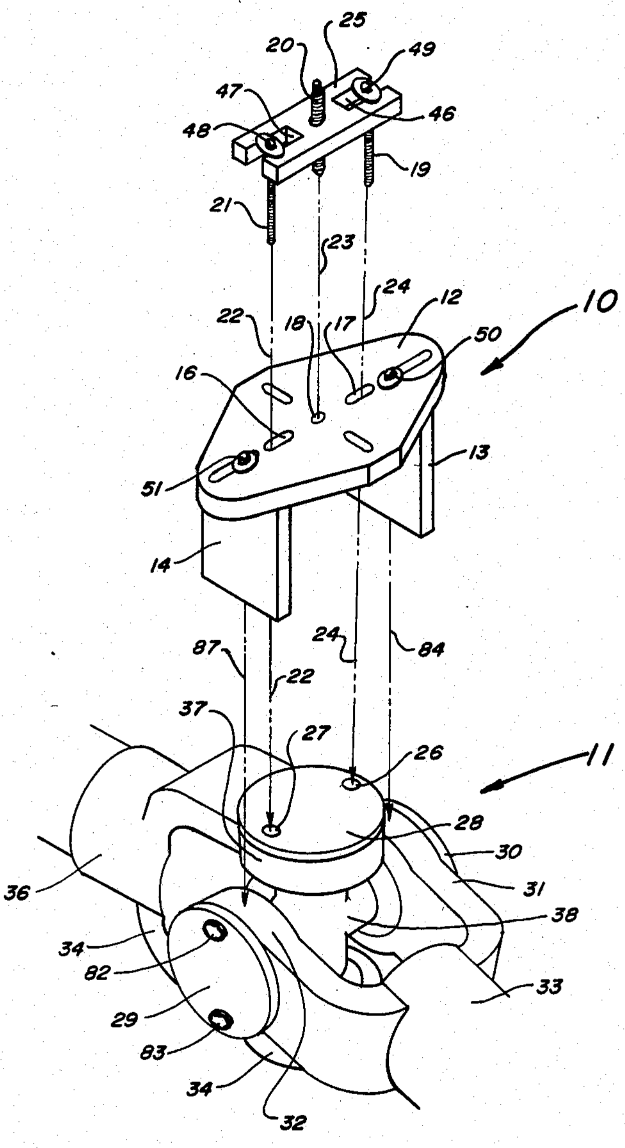
FIG. 3 is a perspective view showing the universal joint servicing tool in position to remove a bearing cup from a universal joint.

FIGS. 2 and 3 show the construction and operation of universal joint servicing tool 10. More specifically, FIG. 2 is a cross-sectional view of the complete universal joint servicing tool 10 taken along lines 2—2 of FIG. 1 and showing the tool's basic structure. FIG. 3 is a perspective view showing universal joint servicing tool 10 in position to disassemble a universal joint. In considering the operation of universal joint servicing tool 10, one should refer simultaneously to FIGS. 2 and 3. Pusher plate 25, used in exerting pressure against base plate 12 by means of pusher bolt 20, is constructed of metal or other appropriate material, and includes slots 46 and 47, designed to accept bolts 19 and 21, which are slidable therein, making pusher plate 25 usable with universal joints of different sizes. Washers 66 and 67 are provided to prevent heads 48 and 49 of bolts 19 and 21 from sliding through slots 46 and 47. Threaded hole 58 is provided for the insertion of pusher bolt 20. Pusher bolt 20 has a head 57, utilized in turning it, and a pointed end 63 designed to engage shallow hole 18 of base plate 12. Bolts 50 and 51 are threaded so that they screw into threaded holes 61 and 62 of legs 13 and 14 respectively, thereby holding legs 13 and 14 in position against base plate 12. Washers 59 and 60 are provided to protect the surface of base plate 12 when bolts 50 and 51 are tightened down, and to help prevent the heads of bolts 50 and 51 from sliding through slots 52 and 53. Base plate 12 is relieved at 68 and 69 so that legs 13 and 14 are easily held in position and proper orientation with respect to base plate 12.

Figure 4:
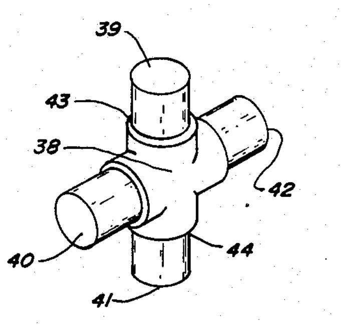
FIG. 4 is a perspective view of a cross 38 utilized in a universal joint.

Now to concentrate more specifically on FIG. 3 of the drawings: universal joint servicing tool 10 is shown in position to be used in the disassembly of universal joint 11. As disassembly of universal joint 11 is herein discussed, reference will be made as appropriate to cross 38 and its structure as shown in FIG. 4. In disassembly of universal joint 11, base plate 12, together with its attached legs 13 and 14, is slid down over arm 37 of yoke 36, whicn is attached to a drive line, so that leg 13 rests against arm 31 of yoke 33 and leg 14 rests against arm 32 of yoke 33. After the screws which hold bearing cup 28 in position have been removed from holes 26 and 27, screws 19 and 21 are screwed into holes 26 and 27 respectively to position pusher plate 25 with respect to arm 37 of yoke 36. Screws 19 and 21 extend through elongated slots 16 and 17 along lines 22 and 24. With legs 13 and 14 of universal joint servicing tool 10 resting against arms 31 and 32 of yoke 33 as shown by lines 84 and 87, and with pusher plate 25 positioned as noted, pusher bolt 20 is screwed in until its end 63 contacts shallow hole 18 in base plate 12. As pusher bolt 20 is tightened down against base plate 12, it pushes down on legs 13 and 14 of universal joint servicing tool 10, and consequently pushes arms 31 and 32 of yoke 33 downward and away from arm 37 of yoke 36. In tne process of doing so, it also forces cross 38 of universal joint 11 downward toward arm 34 of yoke 36. As cross 38 is pushed down toward arm 34 of yoke 36, the ridge 44 of arm 41 contacts the bearing cup in arm 34 of yoke 36 and exerts pressure on it, thereby pushing that bearing cup out of arm 34. If difficulty is encountered in removal of the bearing cup of arm 34, a blow torch or other means of heating arm 34 and the bearing cup associated therewith may be utilized to assist in the removal. Because universal joint servicing tool 10 acts in a pushing, rather than a pulling, motion, and because it concentrates on the removal of a bearing cup opposite it, heat may be used to assist in removing the bearing cup without likelihood of damage to universal joint servicing tool 10. After the universal joint 11 has been disassembled, reassembly is accomplished through insertion of new bearing cups or a new cross 38, or both. The new bearing cups are held in position by screws in the same manner in which screws 82 and 83 hold bearing cup 29 in position.

FIG. 4 is a perspective view of cross 38 of universal joint 11 showing its construction. As here shown, cross 38 includes four arms 39, 40, 41 and 42, each having ledges, ledges 43 and 44 being specifically numbered for reference. As cross 38 is pushed upward, downward or sideways, the ledge associated with the pertinent arm presses against the bearing cup to be removed, loosening it.

While the foregoing description of the invention has shown a preferred embodiment using specific terms, such description is presented for illustrative purposes only. It is applicant's intention that changes and variations may be made without departure from the spirit or scope of the following claims, and this disclosure is not intended to limit applicant's protection in any way.

I claim:

1. A universal joint servicing tool for removing bearing cups from the arms of the yoke of a universal joint of the type utilizing a first yoke member and a second yoke member, each said yoke member having first and second arms in opposing relationship, each of said arms having a bearing cup mounted therein, and a cross adapted to be mounted in said bearing cups, comprising:
 base plate means adapted to fit over said first arm of said first yoke member consisting substantially of:
  a base plate having a first end and a second end and a first hole extending through said base plate positioned nearer to said first end of said base plate than to said second end of said base plate and a second hole extending through said base plate positioned nearer to said second end of said base plate than to said first end of said base plate;
  a first leg attached to said first end of said base plate and positioned and oriented to rest against said first arm of said second yoke member, and
  a second leg attached to said second end of said base plate and positioned and oriented to rest against said second arm of said second yoke member, and
 pusher plate means adapted to be connected to said first arm of said first yoke member, consisting substantially of a pusher plate having:
  a first end;
  a second end;
  a threaded hole extending through said pusher plate positioned substantially midway between said first end and said second end of said ' pusher plate;
  a first hole extending through said pusher plate positioned nearer to said first end of said pusher plate than to said second end of said pusher plate, and
  a second hole extending through said pusher plate positioned nearer to said second end of said pusher plate than to said first end of said pusher plate;
 first fastening means extending through said first hole in said pusher plate and said first hole in said base plate adapted to attach to said first arm of said first yoke member;
 second fastening means extending through said second hole in said pusher plate and said second hole in said base plate adapted to attach to said first arm of said first yoke member, and
 a threaded rod extending through said threaded hole in said pusher plate to butt against said base plate so that, as said threaded rod is tightened against said base plate, said threaded rod pushes said base plate away from said pusher plate, forcing said first and second arms of said second yoke member and said cross toward said second arm of said first yoke member, thereby ejecting said bearing cup from said second arm of said first yoke member.

2. The invention of claim 1 wherein said first leg is attached to said base plate by adjustable attaching means whereby the distance between said first leg and said second leg is adjustable to accommodate universal joints utilizing yokes of different sizes.

3. A universal joint servicing tool for removing bearing cups from the arms of the yoke of a universal joint of the type utilizing a first yoke member and a second yoke member, each said yoke member having first and second arms in opposing relationship, each of said arms having a bearing cup mounted therein, and a cross adapted to be mounted in said bearing cups, comprising:
 base plate means adapted to fit over said first arm of said first yoke member consisting substantially of:
  a base plate having a first end and a second end and a first hole extending through said base plate positioned nearer to said first end of said base plate than to said second end of said base plate and a second hole extending through said base plate positioned nearer to said second end of said base plate than to said first end of said base plate;
  a first leg attached to said first end of said base plate and positioned and oriented to rest against said first arm of said second yoke member, and a second leg attached to said second end of said base plate and positioned and oriented to rest against said second arm of said second yoke member, and pusher plate means adapted to be connected to said first yoke member consisting substantially of a pusher plate having:

a first end;

a second end;

a threaded hole extending through said pusher plate substantially midway between said first end and said second end of said pusher plate;

a first slot extending through said pusher plate positioned nearer to said first end of said pusher plate than to said second end of said pusher plate, and a second slot extending through said pusher plate positioned nearer to said second end of said pusher plate than to said first end of said pusher piate;

first fastening means extending through said pusher plate and said first hole in said base plate adapted to attach to said first arm of said first yoke member;

second fastening means extending through said second slot in said pusher plate and said second hole in said base plate adapted to attach to said first arm of said first yoke member, and a threaded rod extending through said threaded hole in said pusher plate to butt against said base plate so that, as said threaded rod is tightened against said base plate, said threaded rod pushes said base plate away from said pusher plate, forcing said first and second arms of said second yoke member and said cross toward said second arm of said first yoke member, thereby ejecting said bearing cup from said second arm of said first yoke member.

4. The invention of claim 3 wherein said first leg is attached to said base plate by adjustable attaching means whereby the distance between said first leg and said second leg is adjustable to accommodate universal joints utilizing yokes of different sizes.

5. A universal joint servicing tool for removing bearing cups from the arms of the yoke of a universal joint of the type utilizing a first yoke member and a second yoke member, each said yoke member having first and second arms in opposing relationship, each of said arms having a bearing cup mounted therein, and a cross adapted to be mounted in said bearing cups, comprising:

base plate means adapted to fit over said first arm of said first yoke member consisting substantially of:

a base plate having a first end and a second end and a first hole extending through said base plate positioned nearer to said first end of said base plate than to said second end of said base plate and a second hole extending through said base plate positioned nearer to said second end of said base plate than to said first end of said base plate;

a first leg attached to said first end of said base plate and positioned and oriented to rest against said first arm of said second yoke member, and a second leg attached to said second end of said base plate and positioned and oriented to rest against said second arm of said second yoke member;

pusher plate means adapted to be connected to said first arm of said first yoke member, consisting substantially of a pusher plate having:

a first end;

a second, and a threaded hole extending through said pusher plate positioned substantially midway between said first end and said second end of said pusher plate;

first fastening means attached to said pusher plate near said first end of said pusher plate extending through said first hole in said base plate and adapted to attach to said first arm of said first yoke member;

second fastening means attached to said pusher plate near said second end of said pusher plate extending through said second hole in said base plate and adapted to attach to said first arm of said first yoke member, and a threaded rod extending through said threaded hole in said pusher plate to butt against said base plate so that, as said threaded rod is tightened against said base plate, said threaded rod pushes said base plate away from said pusher plate, forcing said first and second arms of said second yoke member and said cross toward said second arm of said first yoke member, thereby ejecting said bearing cup from said second arm of said first yoke member.

6. The invention of claim 5 wherein said first leg is attached to said base plate by adjustable attaching means whereby the distance between said first leg and said second leg is adjustable to accommodate universal joints utilizing yokes of different sizes.

* * * * *